United States Patent
Sanada

(10) Patent No.: US 9,670,647 B2
(45) Date of Patent: Jun. 6, 2017

(54) WORK VEHICLE

(71) Applicant: KOMATSU LTD., Tokyo (JP)

(72) Inventor: Kenji Sanada, Hirakata (JP)

(73) Assignee: KOMATSU LTD., Tokyo (JP)

(*) Notice: Subject to any disclaimer, the term of this patent is extended or adjusted under 35 U.S.C. 154(b) by 318 days.

(21) Appl. No.: 14/380,749

(22) PCT Filed: May 30, 2014

(86) PCT No.: PCT/JP2014/064437
§ 371 (c)(1),
(2) Date: Aug. 25, 2014

(87) PCT Pub. No.: WO2014/192924
PCT Pub. Date: Dec. 4, 2014

(65) Prior Publication Data
US 2016/0244946 A1 Aug. 25, 2016

(51) Int. Cl.
*E02F 9/08* (2006.01)
*B60K 15/063* (2006.01)
*E02F 3/32* (2006.01)

(52) U.S. Cl.
CPC .......... *E02F 9/0891* (2013.01); *B60K 15/063* (2013.01); *E02F 9/0808* (2013.01);
(Continued)

(58) Field of Classification Search
CPC ..... E02F 9/0891; E02F 9/0883; E02F 9/0808; E02F 9/0866; E02F 3/32
See application file for complete search history.

(56) References Cited

U.S. PATENT DOCUMENTS

| 2009/0230710 A1* | 9/2009 | Cech | ............... B62D 25/10 296/24.3 |
| 2010/0095634 A1* | 4/2010 | Uto | ............... B60J 5/045 52/784.1 |

(Continued)

FOREIGN PATENT DOCUMENTS

| JP | 10-8499 A | 1/1998 |
| JP | 2000-64348 A | 2/2000 |

(Continued)

OTHER PUBLICATIONS

The international search report for the corresponding international application No. PCT/JP2014/064437, issued on Aug. 19, 2014.

*Primary Examiner* — Brian Swenson
(74) *Attorney, Agent, or Firm* — Global IP Counselors, LLP

(57) ABSTRACT

A hydraulic excavator includes a hydraulic fluid tank cover that covers the side face of the body frame. A latching member is provided to the upper part on the rear face side of the hydraulic fluid tank cover in a state of being attached to the body frame. An insertion plate is provided to the lower part on the rear face side of the hydraulic fluid tank cover in a state of being attached to the body frame, and is disposed substantially along the vertical direction. A latched member is provided to the body frame and is latched by the latching member. A receiver is provided to the body frame, and the insertion plate is inserted therein. A fixing component is located more to the inside of the body than the upper end part of the exterior cover in top view in an attached state, and fixes the latching member to the latched member.

11 Claims, 18 Drawing Sheets

(52) U.S. Cl.
CPC .......... *E02F 9/0866* (2013.01); *E02F 9/0883* (2013.01); *B60Y 2200/412* (2013.01); *E02F 3/32* (2013.01)

(56) References Cited

U.S. PATENT DOCUMENTS

2013/0216344 A1* 8/2013 Uetake ................... B62D 25/10
 414/687
2015/0308162 A1* 10/2015 Kim ...................... E02F 9/0891
 296/190.11

FOREIGN PATENT DOCUMENTS

| JP | 2002-257110 A | 9/2002 |
| JP | 2010-106522 A | 5/2010 |

* cited by examiner

WORK VEHICLE

CROSS-REFERENCE TO RELATED APPLICATIONS

This application is a U.S. National stage application of International Application No. PCT/JP2014/064437, filed on May 30, 2014.

BACKGROUND

Field of the Invention

The present invention relates to a work vehicle.

With a hydraulic excavator or other such work vehicle, an engine, a fuel tank, a hydraulic fluid tank, and so forth are disposed on a body frame constituting the upper structure, and a plurality of cover members are attached to the side faces thereof.

Because these cover members form the exterior portion of the hydraulic excavator, they need to be laid flat so that there are no steps at the joints.

For example, Japanese Laid-Open Patent Application H10-8499 (disclosed on Jan. 13, 1998) discloses a cover structure for a construction machine, which is formed so that a cover support can be attached to the machine in a state in which a cover has been attached to allow the work of assembling cover members and the like to be performed elsewhere besides on the construction machine itself.

SUMMARY

With the cover structure for a construction machine disclosed in the above-mentioned publication, because the covers and so forth can be attached to the body frame in a state of already having been assembled to the cover supports, the work can be performed more efficiently.

Nevertheless, with this attachment structure, it tends to be difficult for the operator to access the locations where the cover supports are attached to the body frame. This attachment job can be particularly difficult when the cover members cannot be opened and shut.

It is an object of the present invention to provide a work vehicle with which cover members that cannot be opened and shut can be attached easily and accurately.

The work vehicle pertaining to a first exemplary embodiment of the present invention comprises a body frame, an exterior cover, a latching member, an insertion plate, a latched member, a receiver, and a fixing component. The exterior cover covers the side faces of the body frame. The latching member is provided to the upper part on the rear face side of the exterior cover in an attached state in which the exterior cover has been attached to the body frame. The insertion plate is provided to the lower part on the rear face side of the exterior cover and extends downward in the attached state. The latched member is provided to an onboard structure which is placed on the body frame, and fixes the latching member. The receiver is provided to the body frame, and the insertion plate is inserted therein. The fixing component is located more to the inside of the body than the upper end part of the exterior cover in top view in the attached state, and fixes the latching member to the latched member.

With a work vehicle in which the side faces of the body frame are covered by a plurality of exterior covers, a latching member provided to the rear face side of the exterior covers and an insertion plate provided beneath the latching member are used to attach the exterior covers to the body frame.

The latching member here is latched to a latched member provided on the body frame side, thereby supporting the exterior cover. The insertion plate is inserted substantially vertically from above. The fixing component that fixes the latching member to the latched member is disposed more to the inside of the body than the upper end part of the exterior covers in top view.

Consequently, when the exterior covers are attached to the body frame, the insertion plate provided beneath the exterior covers on the rear face side is inserted into a receiver provided on the body frame side, and the latching member provided above the insertion plate on the rear face side of the exterior covers is latched to the latched member on the body frame side, which allows the exterior cover to be temporarily fixed to the body frame. Because the fixing component that fixes the latching member to the latched member is disposed more on the inside of the body than the upper end part of the exterior cover in top view, the latching member can be fixed to the latched member with a bolt or the like using the worker's hand, a tool, etc.

As a result, it is harder to access a location under the exterior panels on the rear face side from the outside, but because a fixing method is employed in which the insertion plate and the receiver are merely inserted, and there is no need for fixing with a bolt or the like, the exterior panels can be fixed easily and accurately to the body frame by using a bolt or the like to fix just the latching member and latched member disposed above.

The work vehicle pertaining to a second exemplary embodiment of the present invention is the work vehicle pertaining to the first invention, further comprising an engine, a fuel tank that holds fuel to be supplied to the engine, and a hydraulic fluid tank that is disposed adjacent to the fuel tank and holds hydraulic fluid to be supplied to a work implement. The exterior cover is disposed at a position where it covers the hydraulic fluid tank disposed on the body frame. The latched member is attached to a face on the hydraulic fluid tank side of the fuel tank.

With a configuration in which the exterior cover is attached at a position where it covers the sides of the hydraulic fluid tank, the latched member is provided on an adjacent face of the fuel tank disposed adjacent to the hydraulic fluid tank around the outer edge of the body frame.

Consequently, even when there is no place to attach the latched member on the body frame side, the latched member, which is used to latch the latching member of the exterior cover, can be attached on the body frame side by adding the latched member to an adjacent face of the fuel tank disposed adjacent to the hydraulic fluid tank.

The work vehicle pertaining to a third exemplary embodiment of the present invention is the work vehicle pertaining to the second invention, wherein the upper end part of the exterior cover is located more to the outside of the body than the hydraulic fluid tank in top view, and the fixing component is located between the hydraulic fluid tank and the upper end part of the exterior cover in top view.

The work vehicle pertaining to a fourth exemplary embodiment of the present invention is the work vehicle pertaining to the second or third exemplary embodiments of the present invention, wherein the body frame has a positioning hole at a location that serves as a reference for the location where the receiver is fixed, and a bolt that fixes the fuel tank adjacent to the exterior cover is inserted into the positioning hole.

Here, the positioning hole is provided at a location of the body frame that serves as a reference for the location where the receiver is fixed to attach a plurality of exterior covers accurately to the body frame.

Consequently, attachment accuracy of the positioning hole at the reference position can be improved. This improves accuracy in attaching the receiver disposed near this reference position, which results in better accuracy in assembling the exterior covers.

The work vehicle pertaining to a fifth exemplary embodiment of the present invention is the work vehicle pertaining to any of the first to fourth exemplary embodiments of the present invention, wherein the insertion plate is inserted into the receiver to be substantially parallel to a side face of the body frame, and the exterior cover is attached in a state in which its location with respect to the width direction of the body frame is restricted. The exterior cover is attached in a state in which its position is restricted with respect to the width direction of the body frame.

Here, because the insertion plate provided on the rear face side of the exterior cover is inserted substantially parallel to the side face of the body frame into the receiver provided on the body frame side, the position of the exterior cover is restricted in a direction substantially perpendicular to the side face of the body frame (the width direction of the body frame).

Consequently, the surface of an exterior cover can be more or less positioned by the insertion plate provided beneath the exterior cover on the rear face side. Therefore, the exterior covers can be attached so that of the plurality of exterior covers forming the side faces of the body frame, no step will be produced at adjacent exterior covers.

The work vehicle pertaining to a sixth exemplary embodiment of the present invention is the work vehicle pertaining to any of the first to fifth exemplary embodiments of the present invention, wherein the latching member and the insertion plate are provided on a first end side of the width direction on the rear face of the exterior cover, and the work vehicle further comprises a substantially L-shaped member that is provided on a second end side on the opposite side from the first end side on the rear face of the exterior cover, and that is fixed with respect to a pillar member constituting the body frame.

Here, the latching member and the receiver are provided on the first end side on the rear face side of the exterior cover, and a substantially L-shaped member is fixed to a pillar member constituting part of the body frame at the end on the opposite side (second end).

Consequently, when an adjacent exterior cover is an inspection door or the like that can be opened and shut, a pillar member disposed on the inspection door side can be accessed from the outside, so a bolt or the like can be used to fix the exterior cover to the body frame via the substantially L-shaped member.

The work vehicle pertaining to a seventh exemplary embodiment of the present invention is the work vehicle pertaining to the sixth exemplary embodiment of the present invention, further comprising an inspection door that can be opened and shut and is disposed adjacent to the exterior cover on the second end side.

Here, an inspection door that can be opened and shut is provided at a location that is adjacent to the second end side where the above-mentioned substantially L-shaped member is attached.

Consequently, a bolt or the like can be used to fix the exterior cover to the body frame by accessing the substantially L-shaped member from the outside in a state in which the inspection door is open.

With the present invention, exterior panels can be easily and accurately fixed to a body frame.

DETAILED DESCRIPTION OF THE EXEMPLARY EMBODIMENTS

The hydraulic excavator (work vehicle) 1 pertaining to an exemplary embodiment of the present invention will now be described through reference to FIGS. 1 to 18.

The "forward and backward" and "left and right" directions referred to in the following description mean the "forward and backward" and "left and right" directions as seen from an operator seated in a cab 8 of the hydraulic excavator 1.

Overall Configuration of Hydraulic Excavator 1

Figure 1:
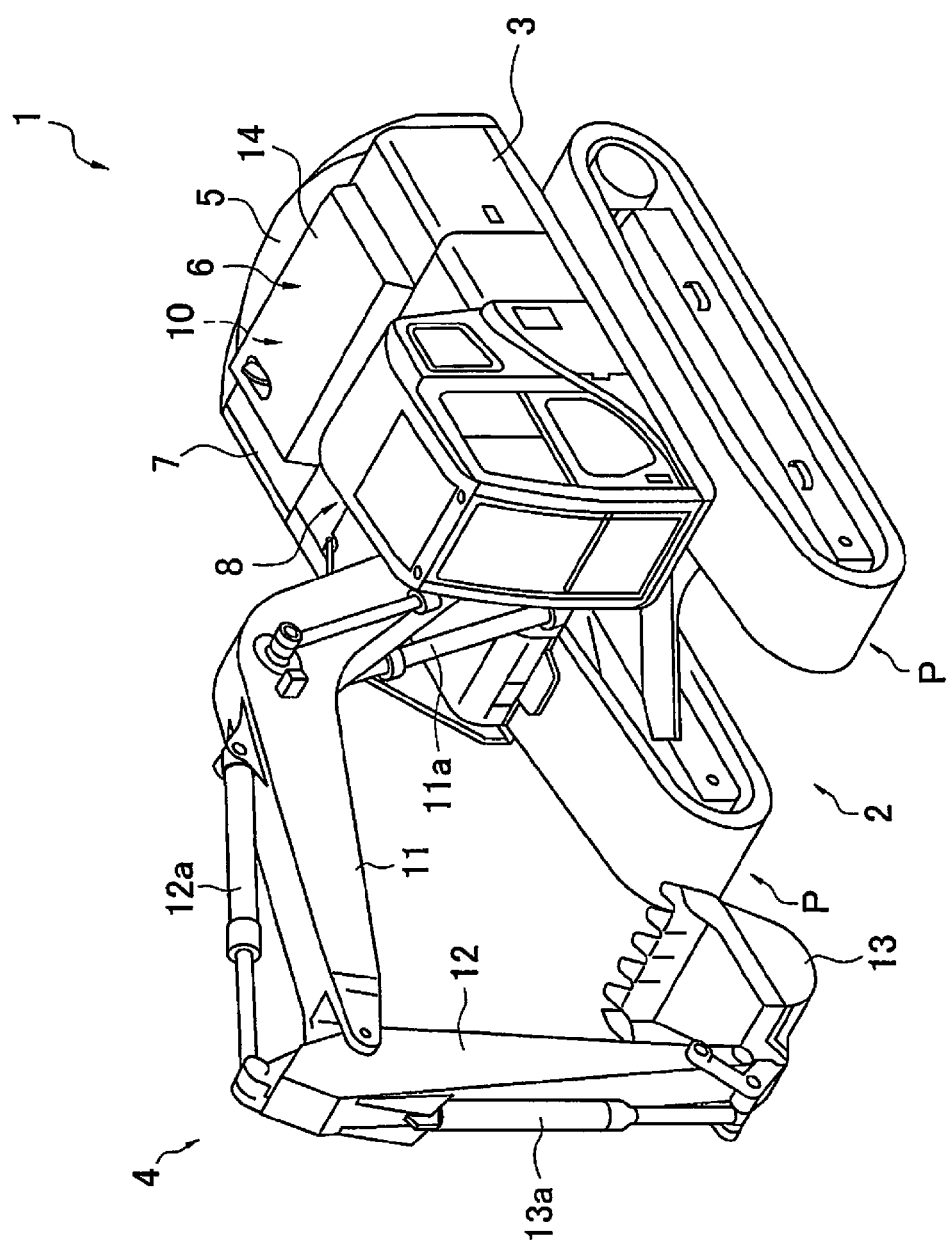
FIG. 1 is an overall oblique view of a hydraulic excavator pertaining to an exemplary embodiment of the present invention.

As shown in FIG. 1, the hydraulic excavator 1 pertaining to this exemplary embodiment comprises a lower traveling unit 2, an upper structure 3, a work implement 4, a counterweight 5, a body component 6, an mechanical compartment 7, and the cab 8.

The lower traveling unit 2 moves the hydraulic excavator 1 forward and backward by rotating crawler belts P, which are wound around the left and right end portions, in the movement direction. The upper structure 3 is installed on the upper face of the lower traveling unit 2.

The upper structure 3 is attached in a rotatable state to the lower traveling unit 2. The work implement 4, the counterweight 5, the body component 6, the mechanical compartment 7, the cab 8, and an engine compartment 10 are installed on the upper face of a body frame 3a (see FIG. 2) constituting a base portion of the upper structure 3.

A plurality of pillar members and a plurality of beam members are provided on the body frame 3a, forming the framework of the upper structure 3.

The pillar members are disposed so as to extend upward from the upper face of the body frame 3a. The beam members are attached substantially horizontally in a state of being connected to the upper end portions of the pillar members.

The work implement 4 (see FIG. 1) is configured to include a boom 11 attached in an operable state to a boom attachment component 3b of the upper structure 3, an arm 12 attached to the distal end of the boom 11, and a bucket 13 attached to the distal end of the arm 12. The work implement 4 uses various hydraulic cylinders 11a, 12a, 13a, etc., included in a hydraulic circuit (not shown) to move the boom 11, the arm 12, the bucket 13, etc., up and down while performing excavation work on dirt, gravel, or the like at a construction site.

The counterweight 5 consists of, for example, a box made of sheet metal and filled with scrap iron, concrete, or the like, and is provided to balance the body during digging or the like. More specifically, the counterweight 5 is disposed on a center frame 3c (see FIG. 4, etc.) provided to the rear of the body component 6 on the upper structure 3.

As shown in FIG. 1, the body component 6 is disposed at a position adjacent to the counterweight 5, and has the engine compartment 10, which holds an engine 20 (see FIG. 2) and so forth in its interior.

The mechanical compartment 7 is disposed to the rear of the work implement 4 on the upper structure 3, and holds a fuel tank (onboard structure) 30, a hydraulic fluid tank 31, control valves, and so forth. The outer peripheral face of the mechanical compartment 7 is covered by a plurality of exterior covers (hydraulic fluid tank cover (exterior cover) 41, inspection door 42, etc.). The configuration around the hydraulic fluid tank 31 will be discussed in detail below.

The cab 8 has an interior space in which the operator of the hydraulic excavator 1 rides, and is disposed at the left-front side, which is to the side of the work implement 4, on the upper structure 3 to afford a view of the distal end of the work implement 4.

Figure 2:
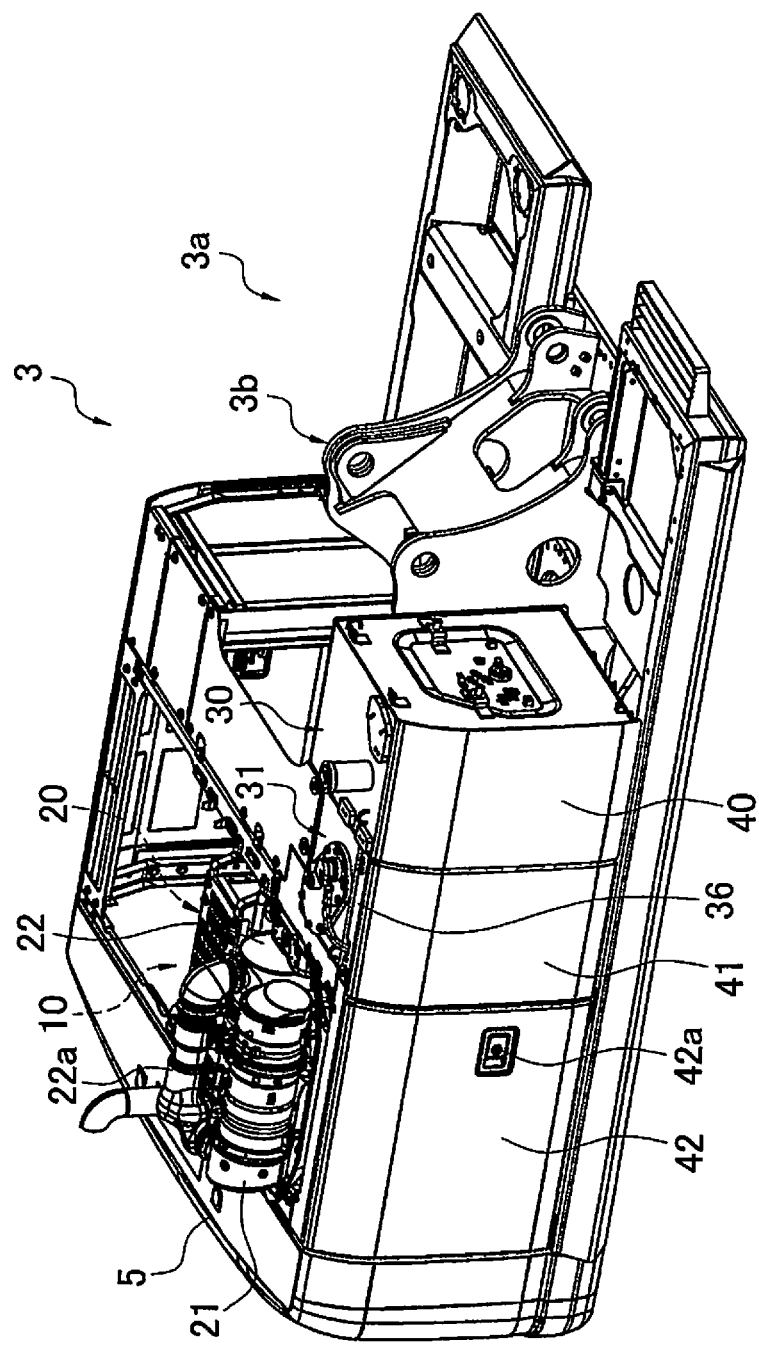
FIG. 2 is an oblique view of an upper structure of the hydraulic excavator in FIG. 1.

The engine compartment 10 has an upper opening that is used for inspection and covered by an engine hood 14 that can be opened and closed. As shown in FIG. 2, the engine compartment 10 houses in its interior the engine 20, a DPF (Diesel Particulate Filter) 21, an SCR (Selective Catalytic Reduction device) 22, and so forth.

The engine 20 is supported via a rubber damper on the center frame 3c of the body frame 3a of the upper structure 3.

The DPF 21 is a device that treats exhaust gas expelled from the engine 20, and uses a filter to trap particulate matter contained in the exhaust gas. The particulate matter trapped by the filter is incinerated in the DPF 21. The DPF 21 is substantially cylindrical in shape, and its axis is disposed in the longitudinal direction as shown in FIG. 2.

The SCR 22 is a device that treats exhaust gas that has been treated by the DPF 21 after being expelled from the engine 20, and selectively reduces nitrogen oxides (NOx) using ammonia obtained by the hydrolysis of urea. As shown in FIG. 2, the SCR 22 is disposed adjacent to and to the side of the DPF 21. The SCR 22 is substantially cylindrical in shape, and its axis is disposed in the longitudinal direction.

The above-mentioned engine 20, DPF 21, and SCR 22 are connected in series in that order. Therefore, the exhaust gas expelled from the engine 20 is first sent to the DPF 21 for treatment (mainly to reduce particulate matter), and then is sent through a mixing pipe 22a to the SCR 22. Treatment to reduce NOx is mainly performed at the SCR 22, after which the purified exhaust gas is expelled to the outside.

Configuration Around Hydraulic Fluid Tank 31

Figure 3:
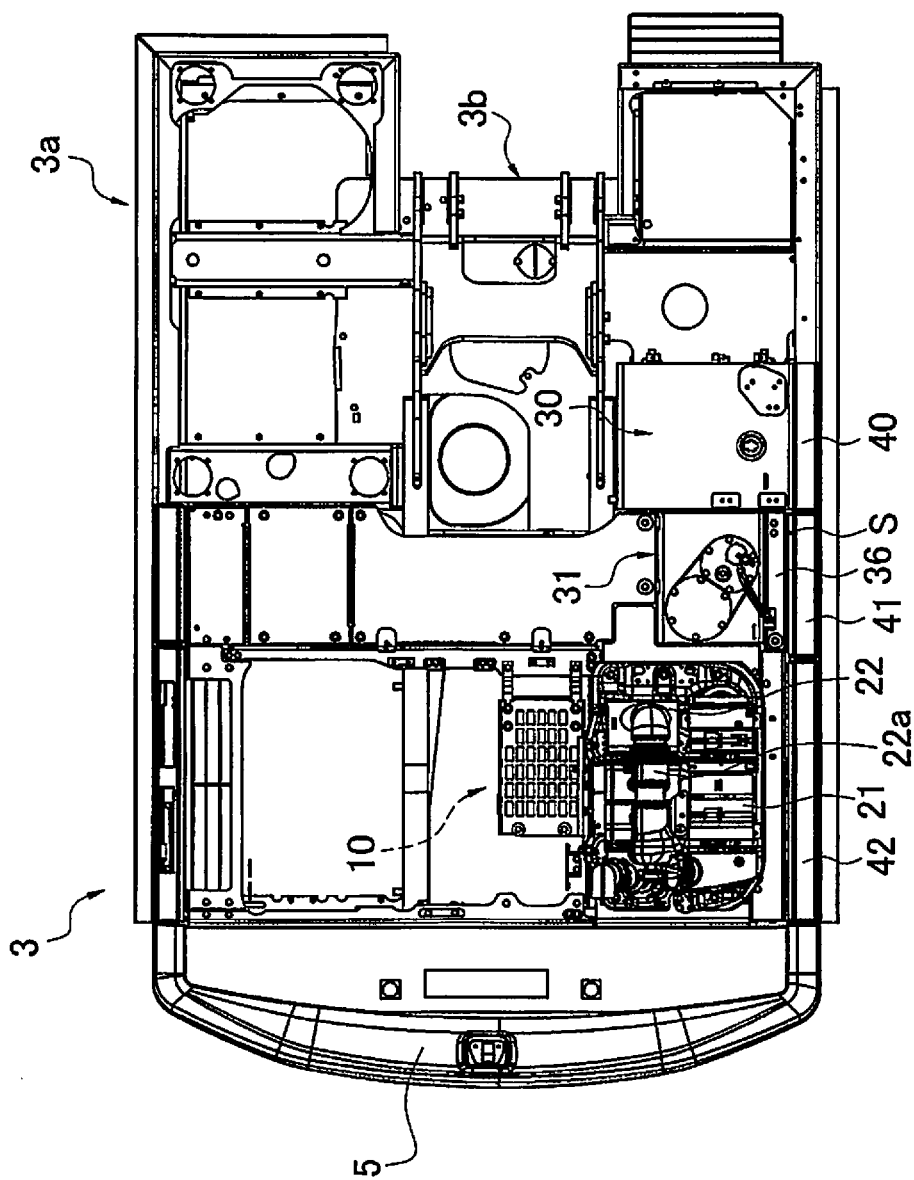
FIG. 3 is a plan view of the upper structure in FIG. 2.

As shown in FIGS. 2 and 3, with the hydraulic excavator 1 in this exemplary embodiment, the fuel tank 30, the hydraulic fluid tank 31, and the engine compartment 10, in which the DPF 21, the SCR 22, etc., are installed, are disposed in that order, starting from the front, on the body frame 3a, along the right side face of the upper structure 3.

The fuel tank 30 is substantially cuboid in shape and holds fuel that is supplied to the engine 20, which is the drive source for the hydraulic excavator 1. As shown in FIG. 3, the fuel tank 30 is disposed on the right side of the boom attachment component 3b, to the right of the body frame 3a of the upper structure 3 in plan view. Furthermore, the fuel tank 30 is disposed along the outer edge of the body frame 3a along with the hydraulic fluid tank 31.

Figure 4:
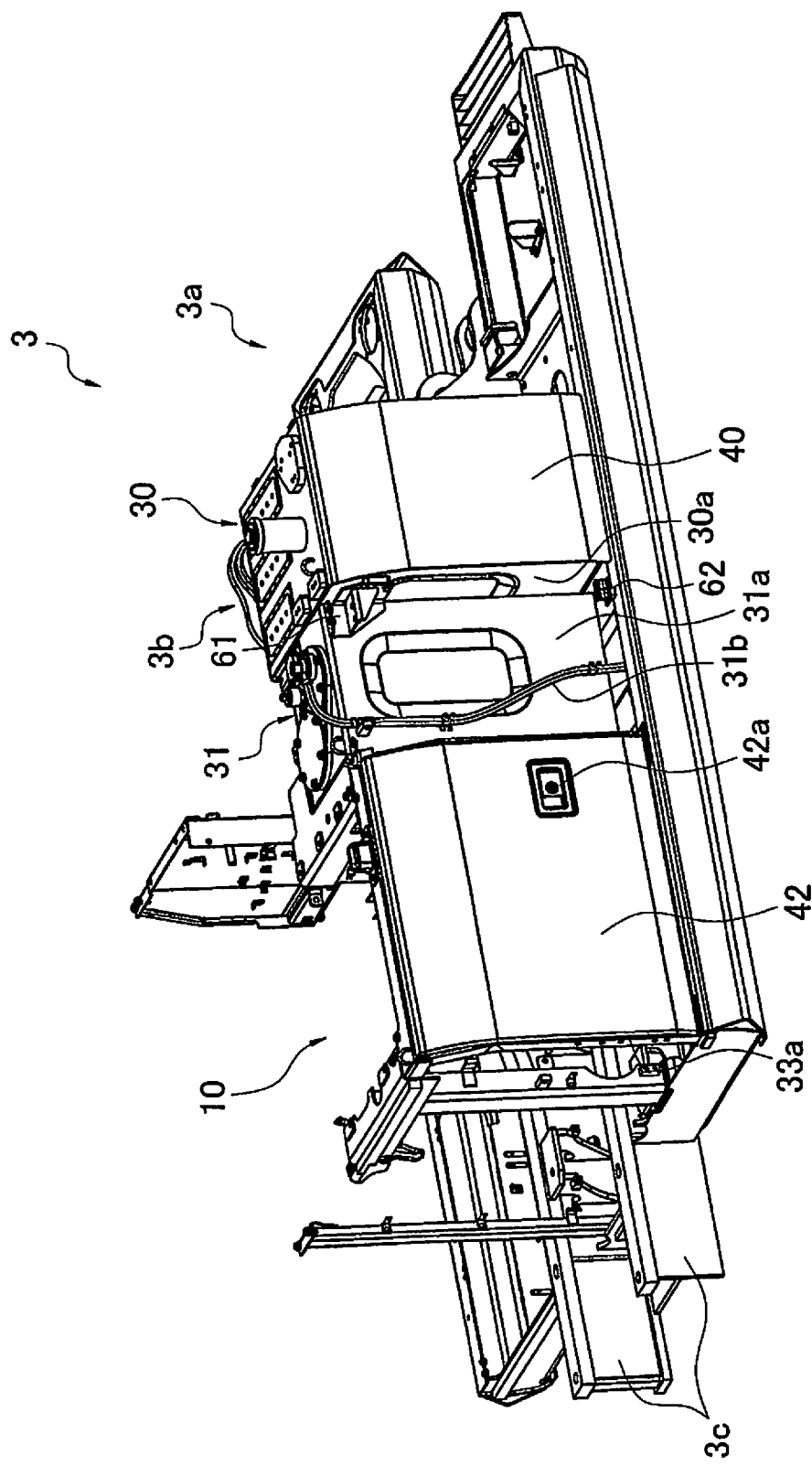
FIG. 4 is an oblique view of the configuration around a fuel tank and a hydraulic fluid tank installed on the body frame constituting the upper structure in FIG. 2.

As shown in FIG. 4, a latched member 61, to which is fixed the hydraulic fluid tank cover 41 (discussed below), is attached to a side face 30a on the hydraulic fluid tank 31 side, out of the plurality of side faces constituting the fuel tank 30.

Figure 5:
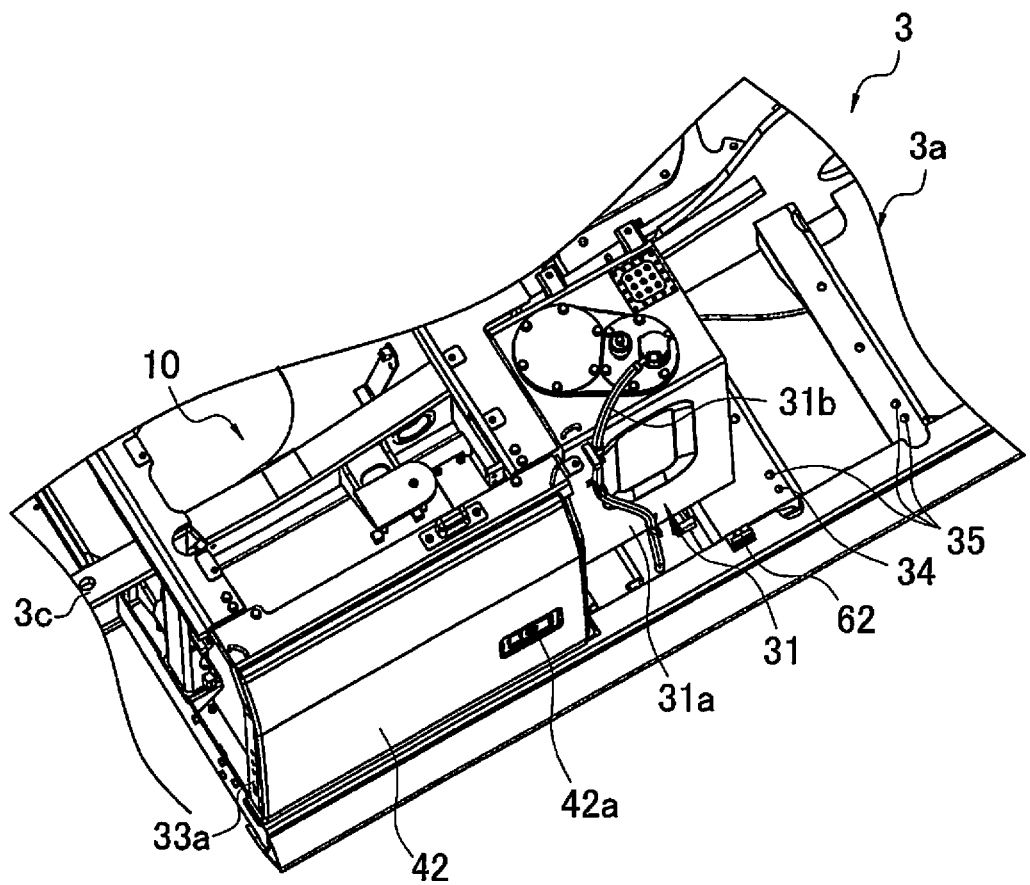
FIG. 5 is an oblique view of the configuration around a fuel tank and a hydraulic fluid tank installed on the body frame constituting the upper structure in FIG. 2.

As shown in FIG. 5, the fuel tank 30 is fixed with bolts to a reference bolt hole 34 and a plurality of bolt insertion holes 35 formed in the upper face of the body frame 3a.

As shown in FIG. 5, the reference bolt hole 34 is formed in the upper face of the body frame 3a at a location adjacent to the hydraulic fluid tank 31, and is smaller in diameter than the bolt insertion holes 35. Consequently, when a bolt has been inserted into the reference bolt hole 34, because the gap formed between the outer peripheral face of the bolt and the inner peripheral face of the reference bolt hole 34 is smaller than the bolt insertion holes 35, the fuel tank 30 can be accurately fixed with respect to the body frame 3a.

In particular, with the configuration in this exemplary embodiment, because the latched member 61, to which is fixed the adjacent hydraulic fluid tank cover 41, is provided to the side face 30a of the fuel tank 30, the positional accuracy of the latched member 61 can be improved by providing the reference bolt hole 34 on the side adjacent to the hydraulic fluid tank 31. Thus, the positional accuracy of the hydraulic fluid tank cover 41 is increased with respect to a side face 40 of the fuel tank 30, so there will be less of a step produced at the portion where the side face 40 of the fuel tank 30 and the hydraulic fluid tank cover 41 are adjacent to each other.

The hydraulic fluid tank 31 holds hydraulic fluid that is supplied to the work implement, etc., and a pipe 31b (see FIG. 4) for discharging hydraulic fluid is attached to the substantially cuboid upper face. The hydraulic fluid tank 31 is disposed to flank the fuel tank 30 adjacent on the front side and the engine compartment 10 adjacent on the rear side.

The hydraulic fluid tank 31 here has substantially the same width in the longitudinal direction as the fuel tank 30, but its size in the left and right direction is smaller than that of the fuel tank 30. Therefore, as shown in FIG. 4, the hydraulic fluid tank 31 is disposed at a position that is further away from the right side face of the body frame 3a than the fuel tank 30. Therefore, the hydraulic fluid tank cover 41 (discussed below) is attached to the side of the hydraulic fluid tank 31 via a gap large enough for the pipe 31b to fit through, with the side face 31a of the hydraulic fluid tank 31 next to it.

The hydraulic fluid tank cover 41 is an exterior cover that forms part of the right side face of the upper structure 3, and is substantially the same size as the hydraulic fluid tank 31 in the longitudinal direction. As shown in FIG. 4, the rear face of the hydraulic fluid tank cover 41 is attached to the side of the hydraulic fluid tank 31 in a state in which a gap is left between it and the side face 31a of the hydraulic fluid tank 31. The pipe 31b of the hydraulic fluid tank 31 is run through this gap.

The attachment structure of the hydraulic fluid tank cover 41 will be discussed in detail below.

The inspection door 42 is an exterior cover that forms part of the right side face of the upper structure 3, as is the hydraulic fluid tank cover 41, and is attached between two pillar members 33a and 33b provided on the body frame 3a of the upper structure 3 in a state that allows opening and closing. More specifically, the inspection door 42 has a handle 42a provided at a location near the right on front face, and this handle is turned around a rotational shaft (not shown) fixed to the pillar member 33a, which opens and shuts the door with respect to the body frame 3a.

Figure 6:
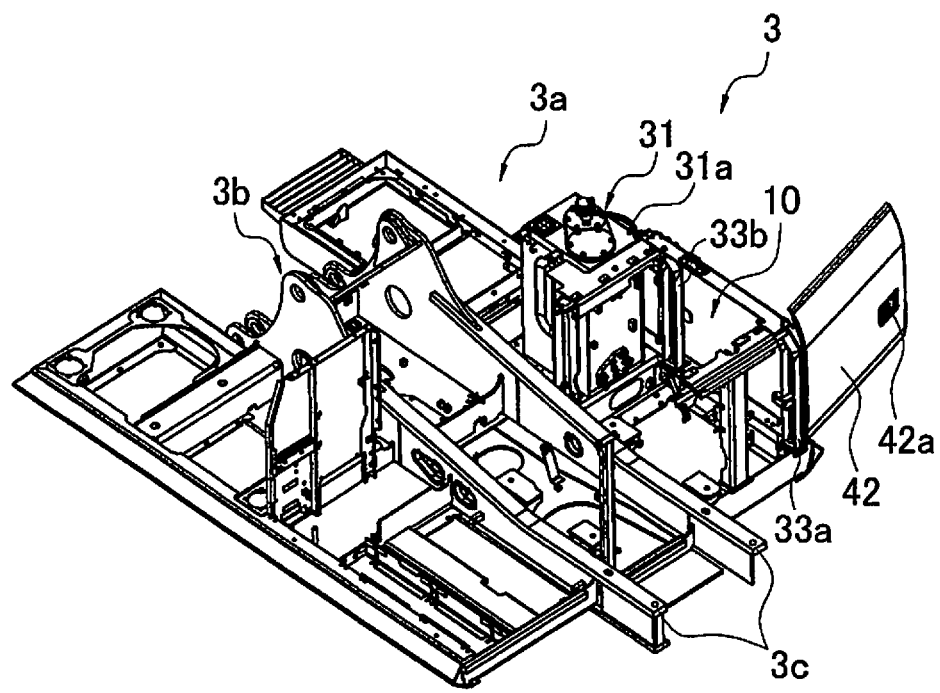
FIG. 6 is an oblique view of the state when an inspection door adjacent to the hydraulic fluid tank installed on the body frame constituting the upper structure in FIG. 2 has been opened.

Consequently, the maintenance of various pipes, filters, and so forth installed in the engine compartment 10 can be carried out via the inspection door 42. Also, the attachment of the hydraulic fluid tank cover 41 adjacent to the inspection door 42 is performed in a state in which the inspection door 42 adjacent on the left side is open. More specifically, as shown in FIG. 6, with the inspection door 42 open, a substantially L-shaped member 53 provided on the left rear face of the hydraulic fluid tank cover 41 can be fixed to the pillar member 33b provided on the body frame 3a.

Attachment Structure of Hydraulic Fluid Tank Cover 41

With the hydraulic excavator 1 in this exemplary embodiment, the hydraulic fluid tank cover 41 is attached to the body frame 3a of the upper structure 3 by the following structure.

In the following description, the "up and down" direction means the direction when the hydraulic fluid tank cover 41 has been attached to the body frame 3a.

Figure 8:
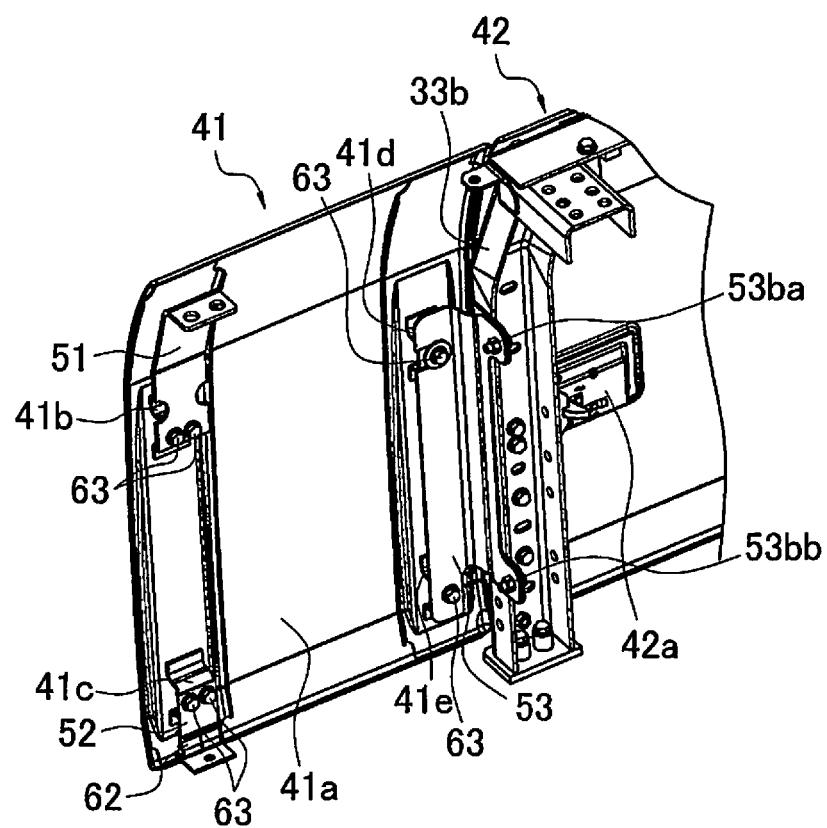
FIG. 8 is an oblique view of the configuration around a hydraulic fluid tank cover that covers the sides of the hydraulic fluid tank installed on the body frame constituting the upper structure in FIG. 2, as seen from the rear face side.

As shown in FIG. 8, a latching member 51, an insertion plate 52, and the L-shaped member 53 are attached to the rear face 41a of the hydraulic fluid tank cover 41.

Figure 9:
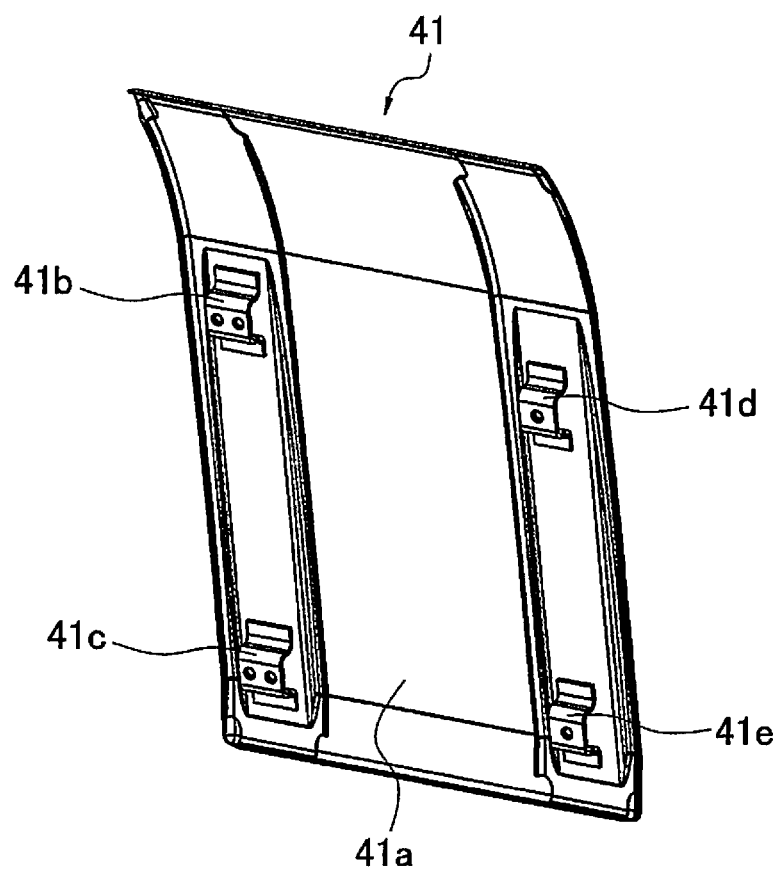
FIG. 9 is an oblique view of the hydraulic fluid tank cover in FIG. 8, as seen from the rear face side.

More specifically, as shown in FIG. 9, seats 41b and 41c are welded above and below to the end of the rear face 41a of the hydraulic fluid tank cover 41 on the side adjacent to the fuel tank 30. Seats 41d and 41e are welded above and below to the end of the rear face 41a on the opposite side (the engine compartment 10 side).

As shown in FIG. 9, the seat 41b is disposed at the upper part of the end of the rear face 41a of the hydraulic fluid tank cover 41 on the side adjacent to the fuel tank 30. As shown in FIG. 8, the latching member 51 is fixed by bolts 63 to the seat 41b.

As shown in FIG. 9, the seat 41c is disposed below the seat 41b at the end of the rear face 41a of the hydraulic fluid tank cover 41 on the side adjacent to the fuel tank 30. As shown in FIG. 8, the insertion plate 52 is fixed to the seat 41c by the bolts 63.

As shown in FIG. 9, the seats 41d and 41e are disposed in the up and down direction at the end of the rear face 41a of the hydraulic fluid tank cover 41 on the side adjacent to the engine compartment 10. As shown in FIG. 8, the L-shaped member 53 is fixed to the seats 41d and 41e with the bolts 63.

The bolts used to fix the various components to the seats 41b to 41e are all numbered the same, but they may be different kinds of bolts of different sizes.

Figure 10:
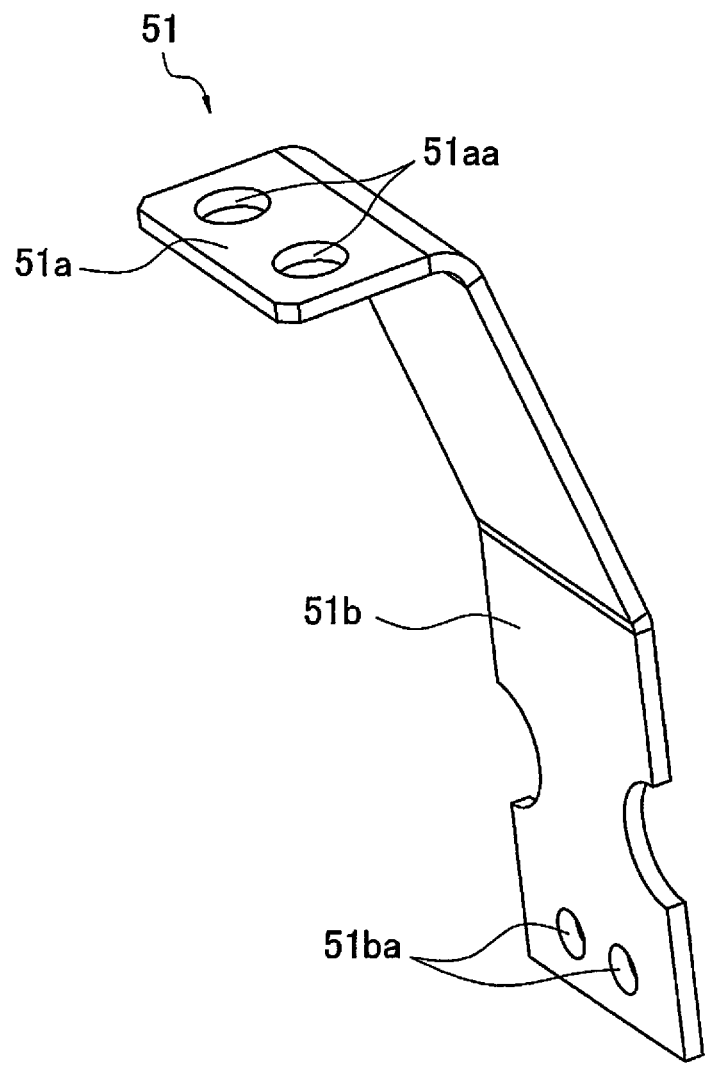
FIG. 10 is an oblique view of the configuration of a latching member attached to the upper part on the rear face side of the hydraulic fluid tank cover in FIG. 8.

The latching member 51 is a linking member used to fix the hydraulic fluid tank cover 41 on the body frame 3a side, and is fixed to the seat 41b disposed at the upper part on the left side (the first end side) in a front view of the hydraulic fluid tank cover 41 as seen from the rear face 41a side. As shown in FIG. 10, the latching member 51 is formed by bending a single flat member, and has a fixing component 51a and a rear face attachment component 51b.

As shown in FIG. 10, the fixing component 51a is disposed substantially horizontally at the upper end of the latching member 51 when the hydraulic fluid tank cover 41 has been attached. The fixing component 51a has bolt holes 51aa.

Bolts (fixing components) 65 (see FIG. 7) are inserted into the bolt holes 51aa in a state in which the latching member 51 has been latched to the latched member 61. This allows the latching member 51 to be fixed with respect to the latched member 61.

Here, the upper end of the hydraulic fluid tank cover 41 is located more to the outside of the body than the hydraulic fluid tank 31 in top view. The bolts 65 are located in the space between the upper end of the hydraulic fluid tank cover 41 and the hydraulic fluid tank 31 in top view.

The rear face attachment component 51b is a portion that extends downward from the fixing component 51a when the hydraulic fluid tank cover 41 has been attached, and is attached to the seats 41b and 41c attached to the rear face 41a of the hydraulic fluid tank cover 41. The rear face attachment component 51b has a bolt hole 51ba.

A fixing bolt 63 (see FIG. 8) is inserted into the bolt hole 51ba in the attachment of the latching member 51 to the seat 41b attached to the rear face 41a of the hydraulic fluid tank cover 41. This allows the latching member 51 to be fixed to the rear face 41a of the hydraulic fluid tank cover 41.

The insertion plate 52 is a linking member for fixing the hydraulic fluid tank cover 41 on the body frame 3a side, and is fixed to the seat 41c disposed on the lower-left in front view when the hydraulic fluid tank cover 41 is seen from the rear face 41a side. Also, the insertion plate 52 is a flat member that is inserted substantially vertically from above into a receiver 62 (discussed below), and has two bolt holes 52a as shown in FIG. 11.

Two of the bolt holes 52a are provided at the upper end of the insertion plate 52 in the attached state of the hydraulic fluid tank cover 41. The bolts 63 are inserted into the bolt holes 52a to fix the insertion plate 52 to the seat 41c.

Figure 11:
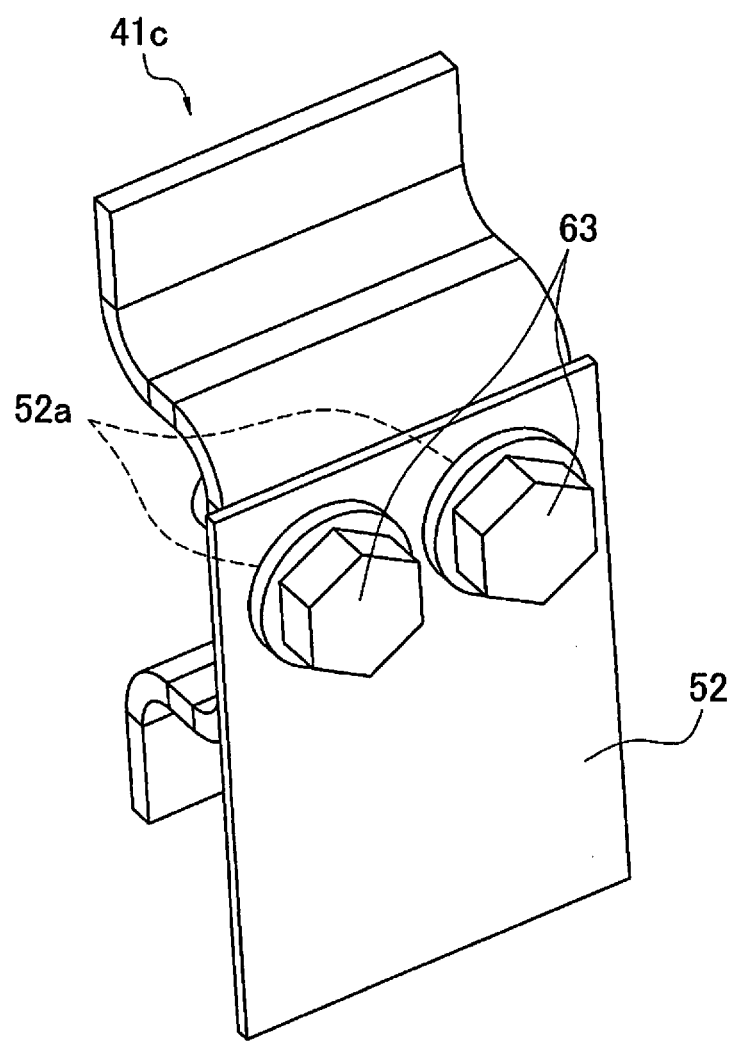
FIG. 11 is an oblique view of the configuration of an insertion plate attached to the lower part on the rear face side of the hydraulic fluid tank cover in FIG. 8.

As shown in FIG. 11, the insertion plate 52 fixed to the seat 41c by the bolts 63 has a portion that protrudes downward. This protruding portion is inserted into the receiver 62 (discussed below) to perform positioning at the lower part of the hydraulic fluid tank cover 41.

The L-shaped member 53 is a linking member that is used to fix the hydraulic fluid tank cover 41 on the body frame 3a side, and is fixed to the seats 41d and 41e disposed along the end on the right side (the second end side) in a front view in which the hydraulic fluid tank cover 41 is seen from the rear face 41a side. Also, as shown in FIG. 12, the L-shaped member 53 is constituted by two flat portions (a first flat component 53a and a second flat component 53b) formed by bending a single flat member.

As shown in FIG. 8, the first flat component 53a is a flat member that is fixed on the rear face 41a side of the hydraulic fluid tank cover 41, and has a bolt groove 53aa and a bolt hole 53ab.

Figure 12:
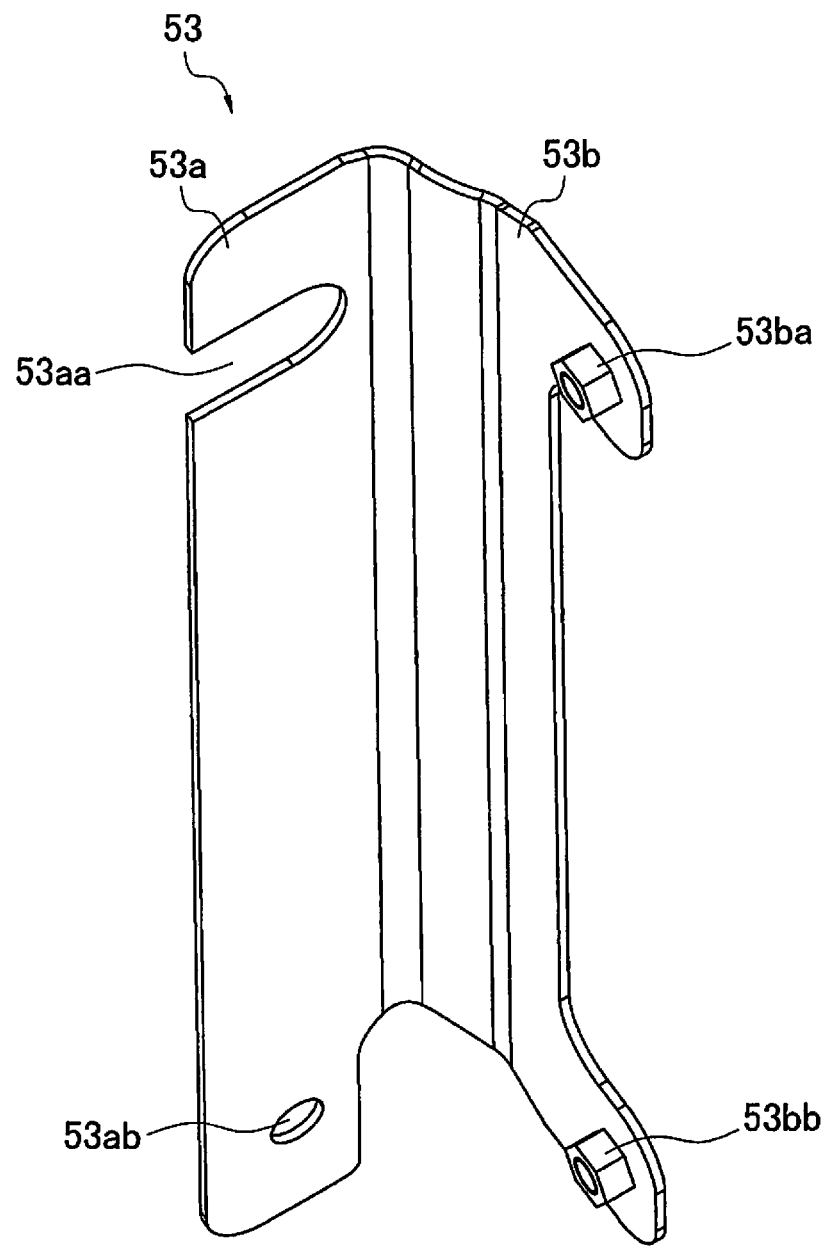
FIG. 12 is an oblique view of the configuration of an L-shaped member attached on the rear face side of the hydraulic fluid tank cover in FIG. 8.

As shown in FIG. 12, the bolt groove 53aa is formed at the upper part of the first flat component 53a in the attached state of the hydraulic fluid tank cover 41. As shown in FIG. 8, the bolt groove 53aa allows the upper part of the L-shaped member 53 to be fixed to the rear face 41a of the hydraulic fluid tank cover 41 by threading a bolt 63 into the bolt hole of the seat 41d.

The bolt groove 53aa is formed as a groove rather than a hole so that it will be easier to make fine adjustments to the position or orientation of the cover in attaching the hydraulic fluid tank cover 41.

As shown in FIG. 12, the bolt hole 53ab is formed at the lower part of the first flat component 53a in the attached state of the hydraulic fluid tank cover 41. As shown in FIG. 8, the bolt hole 53ab allows the lower part of the L-shaped member 53 to be fixed to the rear face 41a of the hydraulic fluid tank cover 41 by threading a bolt 63 into the bolt hole of the seat 41e.

As shown in FIG. 8, the second flat component 53b is a flat member that is fixed to a pillar member 33b, and has a pillar fixing component 53ba and a pillar fixing component 53bb.

As shown in FIG. 12, the pillar fixing component 53ba has a nut portion formed at the upper part of the second flat component 53b in the attached state of the hydraulic fluid tank cover 41. As shown in FIG. 8, the pillar fixing component 53ba allows the upper part of the L-shaped member 53 to be fixed to the pillar member 33b by threading a bolt into the nut portion from the pillar member 33b side.

As shown in FIG. 12, the pillar fixing component 53bb has a nut portion formed at the lower part of the second flat component 53b in the attached state of the hydraulic fluid tank cover 41. As shown in FIG. 8, the pillar fixing component 53bb allows the lower part of the L-shaped member 53 to be fixed to the pillar member 33b by threading a bolt into the nut portion from the pillar member 33b side.

Figure 13:
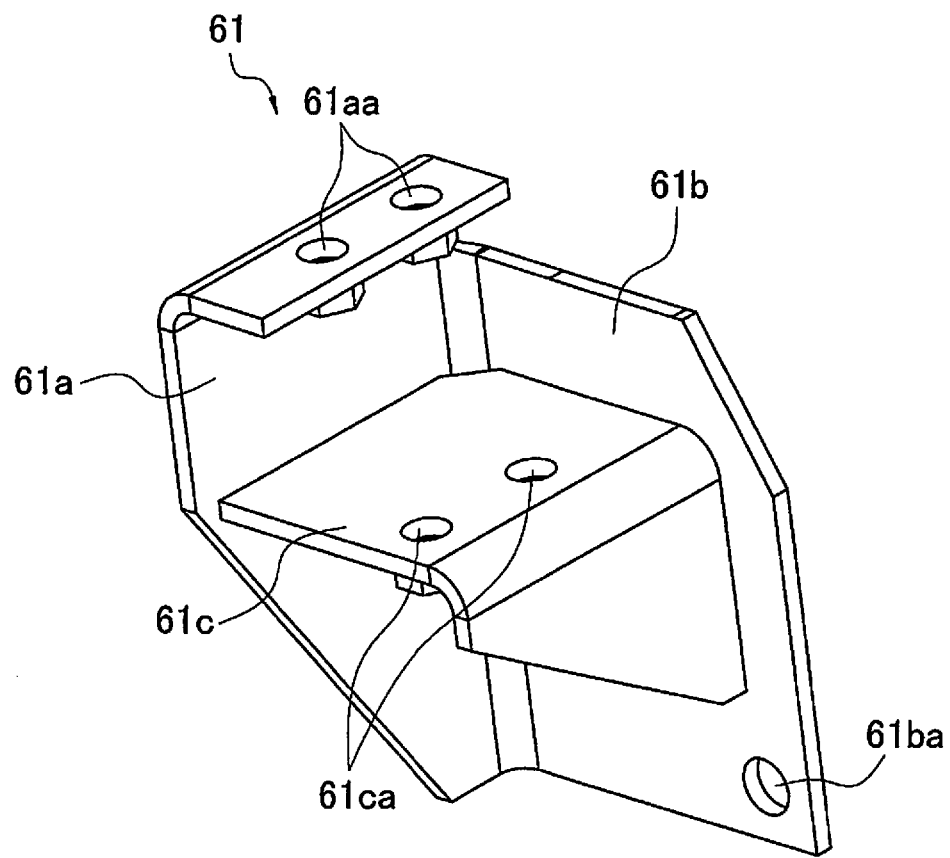
FIG. 13 is an oblique view of the configuration of a latched member to which the latching member in FIG. 12 is latched.
Figure 14:
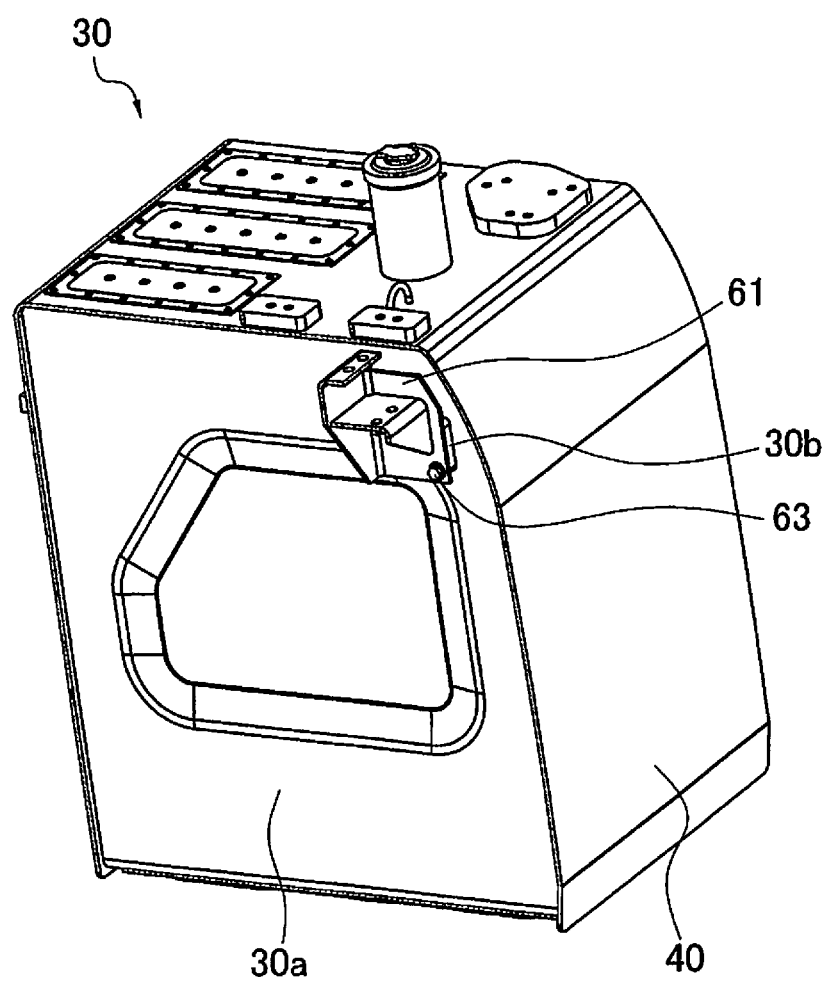
FIG. 14 is an oblique view of the configuration of the fuel tank disposed adjacent to the hydraulic fluid tank installed on the body frame constituting the upper structure in FIG. 2.

The latched member 61 is a member that fixes the latching member 51 fixed on the rear face 41a side of the hydraulic fluid tank cover 41, and as shown in FIG. 13, is constituted by putting together first, second, and third flat components 61a, 61b, and 61c. As shown in FIG. 14, the latched member 61 is attached to the adjacent side face 30a of the fuel tank 30 (onboard structure) disposed adjacent to the hydraulic fluid tank 31.

Figure 15:
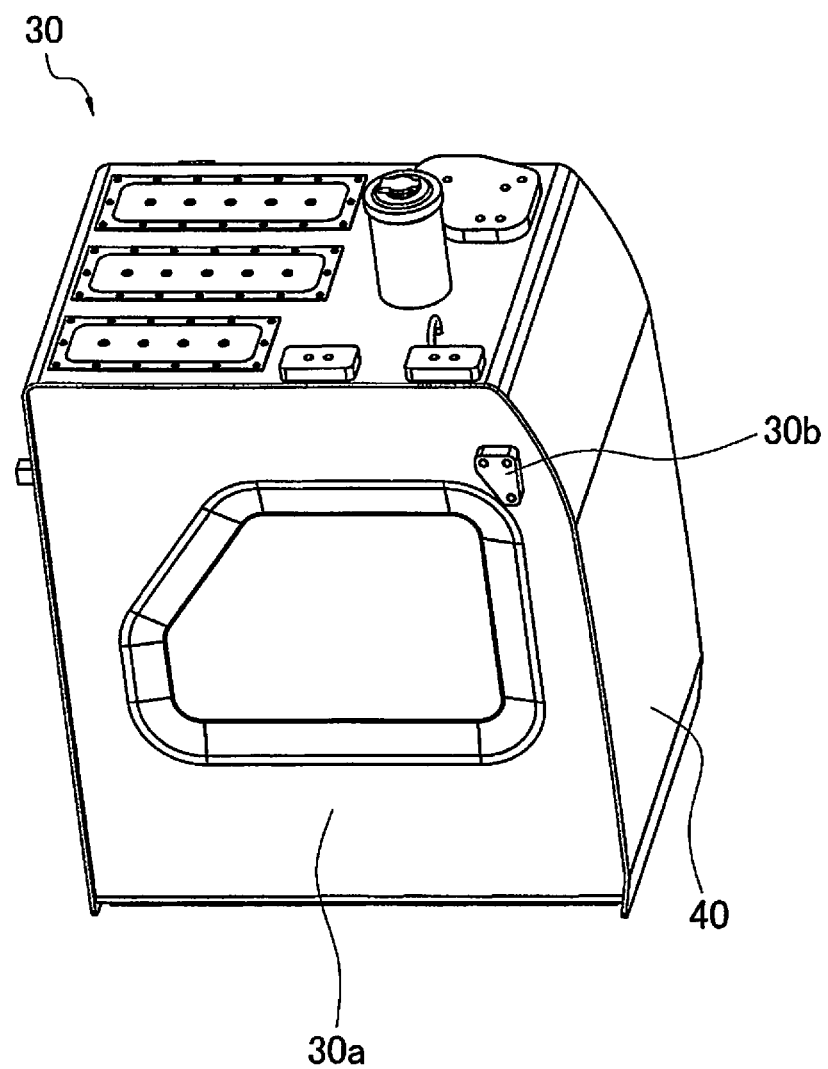
FIG. 15 is an oblique view of the configuration when a base component has been attached to the side face of the fuel tank in FIG. 14.

More specifically, as shown in FIG. 15, the latched member 61 is fixed by the bolts 63 (as shown in FIG. 14) to a base 30b that is welded to the upper-right end on the side face 30a of the fuel tank 30.

As discussed above, the hydraulic fluid tank 31 here is disposed at a position that is further to the inside than the fuel tank 30. Therefore, as shown in FIG. 4, the latched member 61 that is used to fix the hydraulic fluid tank cover 41 can be disposed on the front of the side face 31a of the hydraulic fluid tank 31.

As discussed above, the fuel tank 30 to which the latched member 61 is fixed is itself fixed to the body frame 3a, using the reference bolt hole 34, which is smaller in diameter than the other bolt insertion holes 35, as a reference position.

This allows the fuel tank 30 to be accurately attached to the body frame 3a, and also allows the latched member 61 to be accurately attached to the side face 30a of the fuel tank 30. As a result, because the latching member 51 is fixed with greater positional accuracy to the latched member 61, the hydraulic fluid tank cover 41 can be attached more accurately to the body frame 3a.

The first to third flat components 61a to 61c that constitute the latched member 61 are such that the main portions of the first and second flat components 61 and 61b are disposed substantially vertically, while the main portion of the third flat component 61c is disposed substantially horizontally, in the attached state of the hydraulic fluid tank cover 41.

As shown in FIG. 13, the first flat component 61a is such that the upper end of the main portion disposed substantially vertically is bent on the rear face 41a side of the hydraulic fluid tank cover 41, and two bolt holes 61aa are formed in this bent portion.

A lid member 36 (see FIGS. 3 and 7) for blocking off an opening S (see FIG. 7) that allows the fixing portions of the latching member 51 and the latched member 61 (the heads of the bolts 63) to communicate with the outside is fixed to the bolt holes 61aa.

As shown in FIG. 13, the second flat component 61b is welded substantially vertically to the first flat component 61a, and is disposed substantially parallel to the side face 30a of the fuel tank 30. Also, the second flat component 61b has a bolt hole 61ba formed in its lower end portion.

A bolt is threaded into the bolt hole 61ba to fix the latched member 61 to the base 30b welded to the side face 30a of the fuel tank 30.

The third flat component 61c has a main portion that is disposed substantially horizontally, is welded to the first and second flat components 61a and 61b, and has two bolt holes 61ca.

Figure 7:
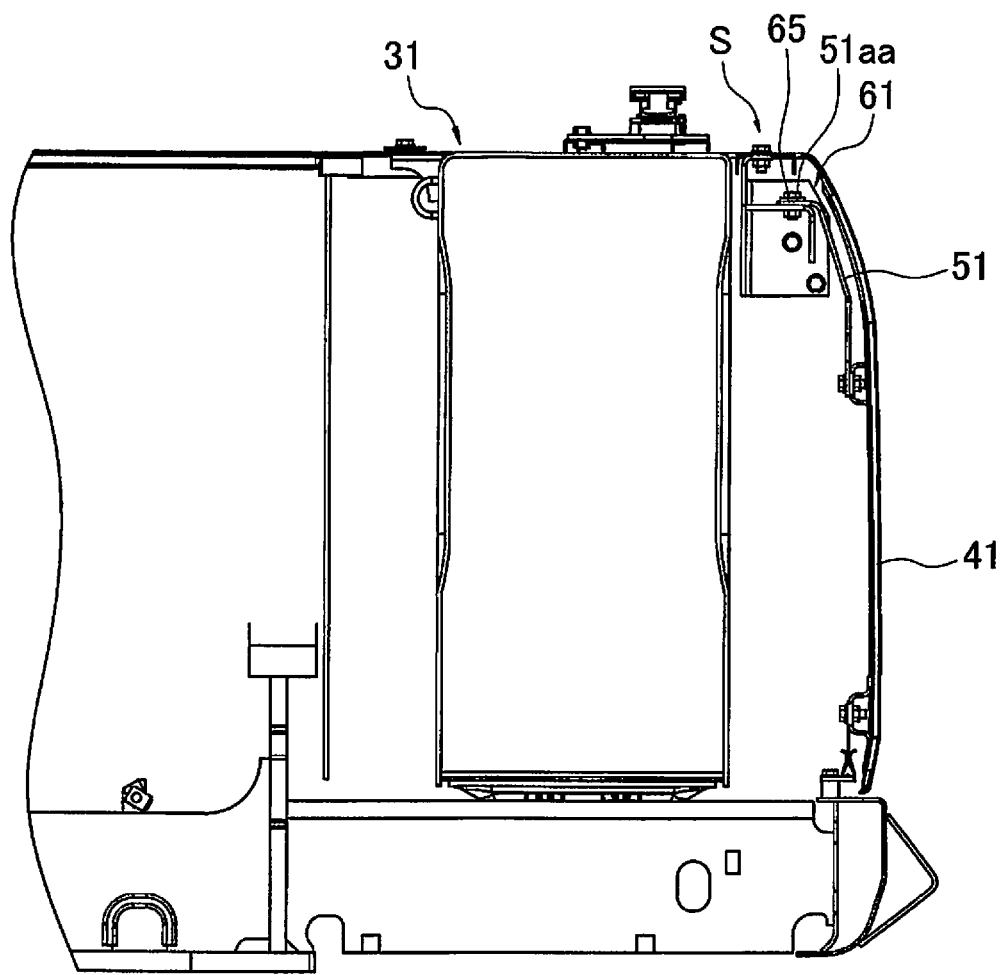
FIG. 7 is a side view of the configuration around the hydraulic fluid tank in FIG. 5.

As shown in FIG. 7, bolts 65 are inserted into the bolt holes 61ca in a state in which the fixing component 51a of the latching member 51 has been latched to the upper face of the third flat component 61c. Consequently, the latching member 51 attached to the rear face 41a of the hydraulic fluid tank cover 41 can be fixed to the latched member 61. The bolts 65 inserted in the bolt holes 61ca are threaded into nut portions fixed on the lower face side of the third flat component 61c.

Figure 16:
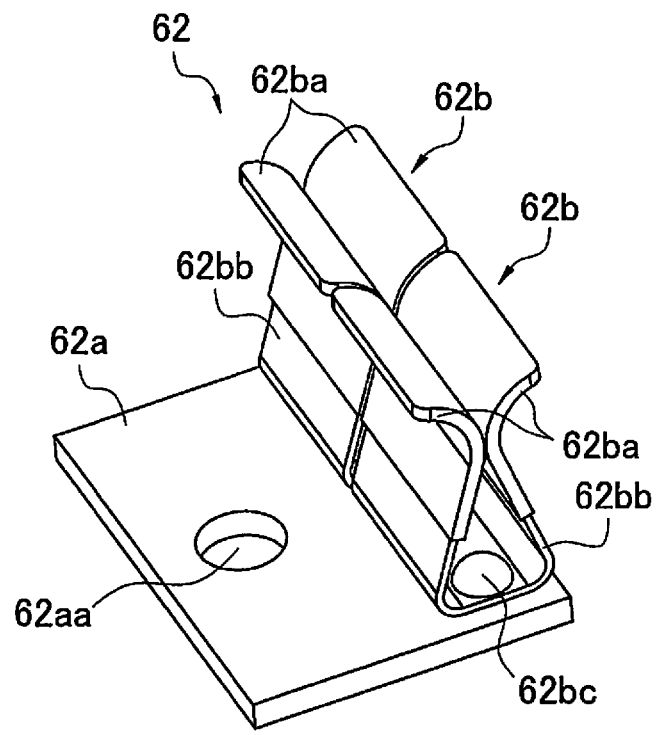
FIG. 16 is an oblique view of the configuration of the receiver into which the insertion plate in FIG. 11 is inserted.

As discussed above, the receiver 62 is a member into which is inserted the insertion plate 52 that moves substantially vertically, and as shown in FIG. 16, has a base plate 62a and an insertion receiver 62b.

The base plate 62a is a flat member that forms the base portion of the receiver 62, and has a bolt hole 62aa formed in it.

Figure 17:
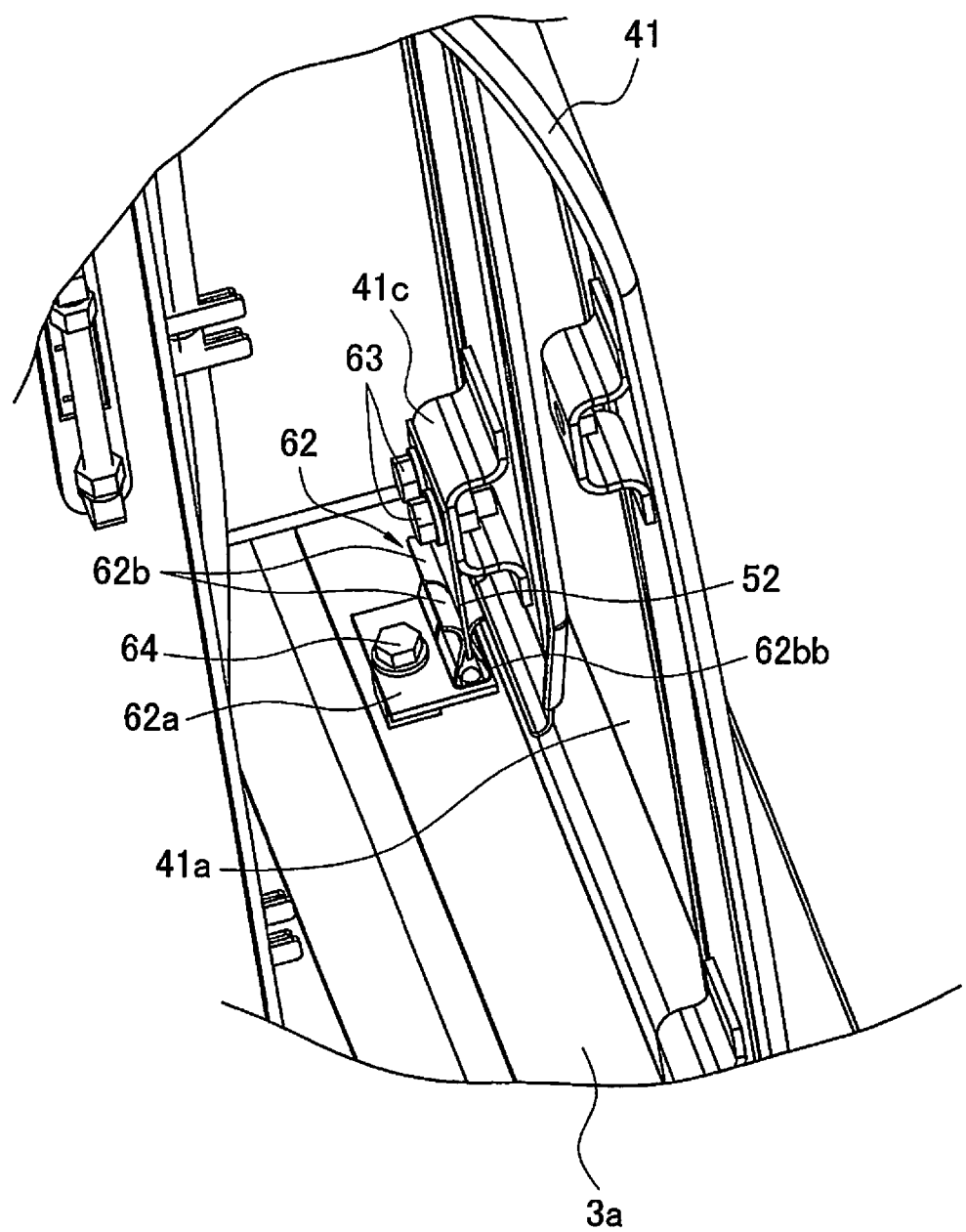
FIG. 17 is an oblique view of the state when the insertion plate in FIG. 14 has been inserted into the receiver in FIG. 15.
Figure 18:
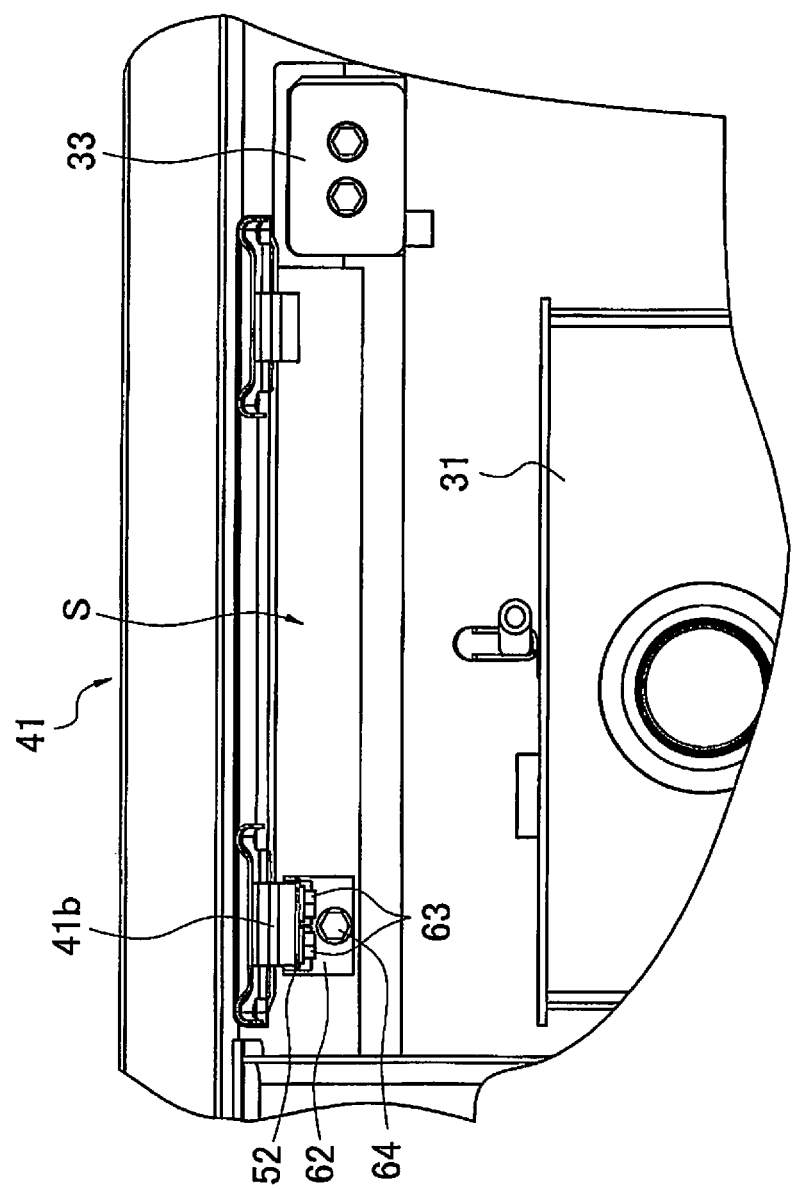
FIG. 18 is a plan view of the state when the insertion plate in FIG. 14 has been inserted into the receiver in FIG. 15.

As shown in FIGS. 17 and 18, a bolt 64 for fixing the receiver 62 on the body frame 3a is inserted into the bolt hole 62aa (FIG. 16).

The bolt 64 is threaded into a bolt hole formed on the body frame 3a side, which fixes the receiver 62 to the upper face of the body frame 3a.

As shown in FIG. 16, the insertion receiver 62b is fixed by two welds to the upper face of the base plate 62a, and has a clip shape that supports the insertion plate 52 inserted from above. As shown in FIG. 16, the insertion receiver 62b has guide components 62ba, support components 62bb, and bolts 62bc.

The guide components 62ba are formed to open upward to guide the insertion plate 52 inserted from above to the inside of the insertion receiver 62b.

The support components 62bb support the distal end portion of the insertion plate 52 that has been guided by the guide components 62ba. More specifically, the insertion plate 52 inserted into the support components 62bb is able to move in a direction substantially parallel to the rear face 41a of the hydraulic fluid tank cover 41 and in the insertion direction, but movement is restricted in the direction intersecting the rear face 41a of the hydraulic fluid tank cover 41 (the body width direction).

The bolts 62bc are inserted into holes formed in the bottom of the clip-shaped insertion receiver 62b that opens upward, and fix the insertion receiver 62b to the base plate 62a.

Consequently, the insertion plate 52 can be inserted into the receiver 62 by moving the hydraulic fluid tank cover 41 downward and parallel to the rear face 41a from substantially vertically above. At this point, as shown in FIG. 18, the movement of the insertion plate 52 in a direction that intersects the rear face 41a is restricted by the receiver 62, so it is less likely that there will be a step at the inspection door 42 and the side face 40 of the fuel tank 30 adjacent to the hydraulic fluid tank cover 41.

In a state in which the insertion plate 52 has been inserted into the receiver 62, the above-mentioned latching member 51 latches the latched member 61, which supports the entire hydraulic fluid tank cover 41, so as shown in FIG. 17, there is a gap between the distal end of the insertion plate 52 and the bottom portion of the support components 62bb of the receiver 62.

At the lower part of the hydraulic fluid tank cover 41, movement is restricted in only a direction that intersects the rear face 41a, and movement is not restricted in two directions parallel to the rear face 41a (the vertical and horizontal directions).

Thus, in fixing the latching member 51 to the latched member 61, or in fixing the substantially L-shaped member 53 to the pillar member 33b, the orientation of the hydraulic fluid tank cover 41 can be finely adjusted.

Procedure for Attaching Hydraulic Fluid Tank Cover 41

With the hydraulic excavator 1 in this exemplary embodiment, the hydraulic fluid tank cover 41 is attached to the body frame 3a of the upper structure 3 by the following procedure.

In attaching the hydraulic fluid tank cover 41 to the body frame 3a to cover the side of the hydraulic fluid tank 31 installed on the upper structure 3, first connection members are attached to the seats 41b to 41e attached to the rear face 41a of the hydraulic fluid tank cover 41 shown in FIG. 9.

More specifically, the latching member 51 (see FIG. 10) is attached to the seat 41b, and the insertion plate 52 (see FIG. 11) to the seat 41c. The L-shaped member 53 (see FIG. 12) is attached to the seats 41d and 41e.

Next, the hydraulic fluid tank cover 41 is lifted up and then lowered at the front of the hydraulic fluid tank 31, and the insertion plate 52 is inserted into the receiver 62. Simultaneously with this, the latching member 51 fixed on the rear face 41a side of the hydraulic fluid tank cover 41 is latched on the latched member 61 fixed to the side face 30a of the fuel tank 30.

Here, the insertion plate 52 is inserted into the receiver 62 while its surface is still substantially parallel to the rear face 41a of the hydraulic fluid tank cover 41. Therefore, when the insertion plate 52 has been inserted into the receiver 62, this restricts movement of the hydraulic fluid tank cover 41 in a direction that intersects the rear face 41a of the hydraulic fluid tank cover 41 (the body width direction). Thus, the insertion relation between the insertion plate 52 and the receiver 62 allows for approximate positioning at the lower part of the hydraulic fluid tank cover 41.

Next, in a state in which the inspection door 42 adjacent to the left side of the hydraulic fluid tank cover 41 has been opened (see FIG. 6), the operator's hand, a tool, or the like is put through the opening that results when the inspection door 42 is opened, and the L-shaped member 53 fixed to the rear face 41a of the hydraulic fluid tank cover 41 is fixed to the pillar member 33b.

Next, a tool is inserted into the opening S (see FIG. 3, FIG. 7, etc.) formed above the latching member 51 and the bolts are tightened to fix the latching member 51 that has been latched on the latched member 61. This allows the hydraulic fluid tank cover 41 to be fixed to the body frame 3a by fixing the latching member 51 to the latched member 61.

Next, the lid member 36 is installed over the opening S to block off the opening S used to fix the latching member 51, and bolts are inserted into the bolt holes 61aa of the latched member 61 to fix the lid member 36.

With the hydraulic excavator 1 in this exemplary embodiment, as discussed above, the hydraulic fluid tank cover 41 can be attached easily and very accurately by using the latching member 51 attached to the upper part of the rear face 41a side of the hydraulic fluid tank cover 41 that covers the side of the hydraulic fluid tank 31, and the insertion plate 52 attached to the lower part on the rear face 41a side.

More specifically, at the lower part on the rear face 41a side, the configuration consists of merely inserting the insertion plate 52 into the receiver 62 fixed on the body frame 3a side, and at the upper part on the rear face 41a side of the hydraulic fluid tank cover 41, the bolts 65 (see FIG. 7) that fix the latching member 51 to the latched member 61 are disposed at positions that are more to the inside of the body than the upper end of the hydraulic fluid tank cover 41 in top view, and which allow fixing with a tool from the outside via the opening S.

Consequently, the places that are fixed with bolts or the like are just the upper portions where the latched member 61 and the latching member 51 are fixed on the rear face 41a side of the hydraulic fluid tank cover 41, and no fixing with bolts or the like is necessary at the lower portions, so the hydraulic fluid tank cover 41 can be attached more easily, and good attachment accuracy can be ensured.

Other Exemplary Embodiments

An exemplary embodiment of the present invention was described above, but the present invention is not limited to or by the above exemplary embodiment, and various modifications are possible without departing from the gist of the invention.

In the above exemplary embodiment, an example was described in which mutually different attachment structures (the latching member 51 and the insertion plate 52 and L-shaped member 53) were used at the ends in the width direction of the hydraulic fluid tank cover 41, but the present invention is not limited to this.

For example, the same attachment structure may be used at both ends in the width direction of the exterior cover.

More specifically, the attachment structure may be such that the latching member 51 and the insertion plate 52 are provided at the ends in the width direction of the exterior cover, and fixed on the body frame side.

In this case, even though an adjacent exterior cover cannot be opened and shut, it can be fixed to the body frame with a bolt or the like through an opening from above. Therefore, just as with the configuration in the above exemplary embodiment, the exterior cover can be attached easily and accurately.

In the above exemplary embodiment, an example was described in which the present invention was applied to an attachment structure of an exterior cover (the hydraulic fluid tank cover 41) that covered the side of the hydraulic fluid tank 31, but the present invention is not limited to this.

For example, the present invention may be applied to an attachment structure for an exterior cover provided to another position on the outer face of a work vehicle, and not just to the side of the hydraulic fluid tank.

In the above exemplary embodiment, an example was described in which the present invention was applied to an attachment structure of the exterior cover (the hydraulic fluid tank cover 41) of the hydraulic excavator 1, but the present invention is not limited to this.

For example, the present invention may be applied to a wheel loader, a crane, a bulldozer, a motor grader, or another such work vehicle instead of to a hydraulic excavator.

In the above exemplary embodiment, an example was described in which the bolts 65 shown in FIG. 7 were used as fixing members for fixing the latching member 51 to the latched member 61, but the present invention is not limited to this.

For example, instead of bolts, the means for fixing the latching member to the latched member 61 may be welding or some other fixing member.

In this case, the same effect as above can be obtained by using the welded places or the other fixing member itself as the fixing component.

In the above exemplary embodiment, an example was described in which the fuel tank 30 disposed adjacent to the hydraulic fluid tank 31 was the onboard structure to which the latched member 61 was fixed, but the present invention is not limited to this.

For example, the onboard structure to which the latched member is fixed may be an onboard structure other than a fuel tank, or may be the pillar members or beam members constituting the body frame 3a.

The work vehicle of the present invention has the effect of allowing an exterior panel to be easily and accurately fixed to a body frame, and therefore can be broadly applied to various kinds of work vehicle in which the side faces of the body are covered by exterior covers.

The invention claimed is:
1. A work vehicle, comprising:
a body frame;
an exterior cover that covers the side faces of the body frame;
a latching member that is provided to an upper part on the rear face side of the exterior cover in an attached state in which the exterior cover has been attached to the body frame;
an insertion plate that is provided to a lower part on the rear face side of the exterior cover and extends downward in the attached state;
a latched member that is provided to an onboard structure which is placed on the body frame, and that fixes the latching member;
a receiver that is provided to the body frame and into which the insertion plate is inserted; and
a fixing component that is located more to an inside of the body frame than an upper end part of the exterior cover in top view in the attached state, and that fixes the latching member to the latched member.

2. The work vehicle according to claim 1, further comprising
an engine, a fuel tank that holds fuel to be supplied to the engine, and a hydraulic fluid tank that is disposed adjacent to the fuel tank and holds hydraulic fluid to be supplied to a work implement,
wherein the exterior cover is disposed at a position where it covers the hydraulic fluid tank disposed on the body frame, and
the latched member is attached to a face on the hydraulic fluid tank side of the fuel tank.

3. The work vehicle according to claim 2, wherein
the upper end part of the exterior cover is located more to the outside of the body than the hydraulic fluid tank in top view, and
the fixing component is located between the hydraulic fluid tank and the upper end part of the exterior cover in top view.

4. The work vehicle according to claim 3, wherein
the insertion plate is inserted into the receiver to be substantially parallel to a side face of the body frame, and
the exterior cover is attached in a state in which its location with respect to the width direction of the body frame is restricted.

5. The work vehicle according to claim 3, wherein
the body frame has a positioning hole at a location that serves as a reference for the location where the receiver is fixed, and
a bolt that fixes the fuel tank adjacent to the exterior cover is inserted into the positioning hole.

6. The work vehicle according to claim 3, wherein
the latching member and the insertion plate are provided on a first end side of the width direction on the rear face of the exterior cover, and
the work vehicle further comprises a substantially L-shaped member that is provided on a second end side on the opposite side from the first end side on the rear face of the exterior cover, and that is fixed with respect to a pillar member constituting the body frame.

7. The work vehicle according to claim 6, further comprising
an inspection door that can be opened and shut and is disposed adjacent to the exterior cover on the second end side.

8. The work vehicle according to claim 2, wherein
the body frame has a positioning hole at a location that serves as a reference for the location where the receiver is fixed, and a bolt that fixes the fuel tank adjacent to the exterior cover is inserted into the positioning hole.

9. The work vehicle according to claim 1, wherein
the latching member and the insertion plate are provided on a first end side of the width direction on the rear face of the exterior cover, and
the work vehicle further comprises a substantially L-shaped member that is provided on a second end side on the opposite side from the first end side on the rear face of the exterior cover, and that is fixed with respect to a pillar member constituting the body frame.

10. The work vehicle according to claim 9, further comprising
an inspection door that can be opened and shut and is disposed adjacent to the exterior cover on the second end side.

11. The work vehicle according to claim 1, wherein
the insertion plate is inserted into the receiver to be substantially parallel to a side face of the body frame, and
the exterior cover is attached in a state in which its location with respect to the width direction of the body frame is restricted.

* * * * *